US012573339B2

(12) United States Patent
Shin et al.

(10) Patent No.: US 12,573,339 B2
(45) Date of Patent: Mar. 10, 2026

(54) DISPLAY DEVICE OPERATING WITH TIME-DIVISION AND CONTROL METHOD THEREOF

(71) Applicant: SAMSUNG ELECTRONICS CO., LTD., Suwon-si (KR)

(72) Inventors: Seungyong Shin, Suwon-si (KR); Myungjoon Kim, Suwon-si (KR); Sujin Kim, Suwon-si (KR); Hyungjin Kim, Suwon-si (KR); Yongmin Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/024,304

(22) Filed: Jan. 16, 2025

(65) Prior Publication Data

US 2025/0191528 A1 Jun. 12, 2025

Related U.S. Application Data

(63) Continuation of application No. PCT/KR2024/018505, filed on Nov. 21, 2024.

(30) Foreign Application Priority Data

Dec. 12, 2023 (KR) ........................ 10-2023-0179676

(51) Int. Cl.
*G09G 3/32* (2016.01)

(52) U.S. Cl.
CPC ......... *G09G 3/32* (2013.01); *G09G 2330/022* (2013.01)

(58) Field of Classification Search
CPC .............................. G11B 9/02; G11B 2220/23
See application file for complete search history.

(56) References Cited

U.S. PATENT DOCUMENTS 7,202,608 B2 * 4/2007 Robinson ........... H05B 45/3725 315/291
7,545,352 B2 6/2009 Kwak et al.
(Continued)

FOREIGN PATENT DOCUMENTS

JP 2009-16384 A 1/2009
KR 10-0590068 B1 6/2006
(Continued)

OTHER PUBLICATIONS

International Search Report and Written Opinion (PCT/ISA/220, PCT/ISA/210, and PCT/ISA/237) dated Mar. 14, 2025, issued by International Searching Authority for International Application No. PCT/KR2024/018505.

*Primary Examiner* — Andrew Sasinowski
(74) *Attorney, Agent, or Firm* — Sughrue Mion, PLLC

(57) ABSTRACT

A display device may include: a power supply; a first display module comprising a first switch connected to the power supply and a second switch connected to a preset voltage; a second display module comprising a third switch connected to the power supply and a fourth switch connected to the preset voltage; one or more processors configured to consecutively supply power to the first display module and the second display module by selectively turning on the first switch, the second switch, the third switch, and the fourth switch; and memory storing instructions that when executed by the one or more processors, cause the one or more processors to: turn on the first switch and the fourth switch during a first time period within a preset time; and turn on the third switch and the second switch during a second time period within the preset time.

20 Claims, 9 Drawing Sheets

(56) References Cited

U.S. PATENT DOCUMENTS

| | | | | |
|---|---|---|---|---|
| 7,956,000 | B2 | 6/2011 | Jansen et al. | |
| 8,289,263 | B2 | 10/2012 | Lee et al. | |
| 8,841,862 | B2 * | 9/2014 | Lee | H05B 45/48 315/306 |
| 11,553,569 | B2 * | 1/2023 | Kim | H05B 45/325 |
| 11,769,448 | B2 | 9/2023 | Mi et al. | |
| 11,839,092 | B2 * | 12/2023 | Zhang | H10K 59/351 |
| 2006/0146000 | A1 * | 7/2006 | Choi | G09G 3/3688 345/100 |
| 2008/0054951 | A1 * | 3/2008 | Singh | G11C 27/026 327/94 |
| 2008/0185978 | A1 | 8/2008 | Jeong et al. | |
| 2015/0302797 | A1 | 10/2015 | Lu et al. | |
| 2016/0078826 | A1 * | 3/2016 | Yoo | G09G 3/3648 345/88 |
| 2016/0148569 | A1 * | 5/2016 | Park | G09G 3/3233 345/212 |
| 2022/0335894 | A1 | 10/2022 | Zhou et al. | |

FOREIGN PATENT DOCUMENTS

| | | | |
|---|---|---|---|
| KR | 10-2006-0100408 | A | 9/2006 |
| KR | 10-2008-0034316 | A | 4/2008 |
| KR | 10-2008-0073464 | A | 8/2008 |
| KR | 10-2011-0024715 | A | 3/2011 |
| KR | 10-2013-0045056 | A | 5/2013 |
| KR | 10-1288593 | B1 | 7/2013 |
| KR | 10-2015-0100687 | A | 9/2015 |
| KR | 10-1718302 | B1 | 3/2017 |
| KR | 10-2022-0117781 | A | 8/2022 |
| KR | 10-2023-0006875 | A | 1/2023 |
| WO | 2023/009480 | A1 | 2/2023 |

* cited by examiner

DISPLAY DEVICE OPERATING WITH TIME-DIVISION AND CONTROL METHOD THEREOF

CROSS-REFERENCE TO RELATED APPLICATION

This application is a bypass continuation of International Application No. PCT/KR2024/018505, filed on Nov. 21, 2024, which is based on and claims priority to Korean Patent Application No. 10-2023-0179676, filed on Dec. 12, 2023, in the Korean Intellectual Property Office, the disclosures of which are incorporated by reference herein in their entireties.

BACKGROUND

1. Field

The disclosure relates to a display device and a control method thereof, and more particularly to a display device configured to control voltage when operating with time-division and a control method thereof.

2. Description of Related Art

With display devices becoming more large-scaled and more high-resolution, display devices are being formed from larger numbers of display modules.

To improve brightness and reduce cost, display devices that operate using a passive matrix method, and display devices that consecutively operate a plurality of display modules through time-division, are being developed.

In the related art, consecutively operating each of the plurality of display modules can be achieved using discharge circuits for controlling remaining potentials in a non-operating display module.

SUMMARY

However, in a process of removing the remaining potentials, shaking of a printed circuit board (PCB) by sudden changes in voltage may occur, and there may be a likelihood of problems occurring such as vibrations, noises, and the like.

There has been a continuous demand for a method for minimizing vibrations and noises which occur in a process of consecutively operating a plurality of display modules while maintaining driving efficiency of the same.

According to one or more example embodiments, a display device may include: a power supply; a first display module comprising a first switch and a second switch, the first switch being connected to the power supply and the second switch being connected to a preset voltage; a second display module comprising a third switch and a fourth switch, the third switch being connected to the power supply and the fourth switch being connected to the preset voltage; one or more processors configured to consecutively supply power to the first display module and the second display module by selectively turning on the first switch, the second switch, the third switch, and the fourth switch; and memory storing instructions that when executed by the one or more processors, cause the one or more processors to: turn on the first switch and the fourth switch during a first time period within a preset time; and turn on the third switch and the second switch during a second time period within the preset time.

According to one or more example embodiments, a method of controlling a display device which consecutively supplies power to a first display module and a second display module through a power supply, may include: powering the first display module by turning on a first switch in the first display module and connected to the power supply, and turning on a fourth switch in the second display module and connected to a preset voltage, during a first time period within a preset time; and powering the second display module by turning on a third switch in the second display module and connected to the power supply and turning on a second switch in the first display module and connected to the preset voltage, during a second time period within the preset time.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
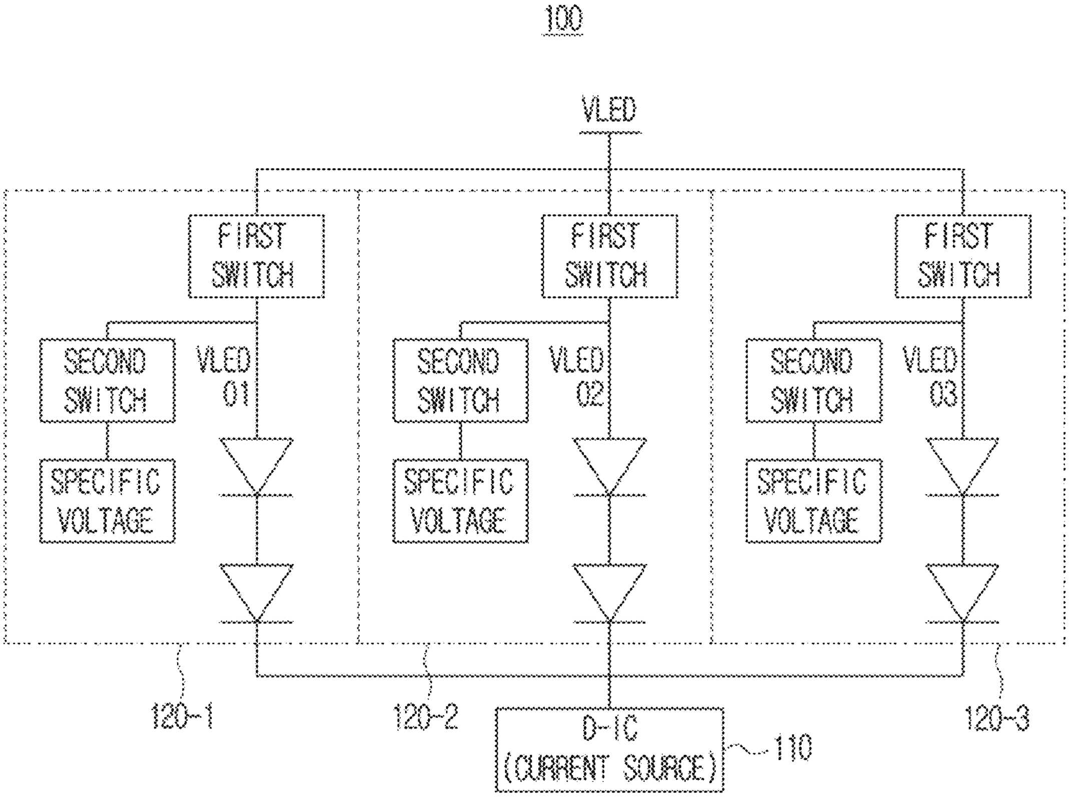
FIG. 1 is a diagram illustrating a display device according to one or more embodiments of the disclosure.

Terms used in the disclosure will be briefly described, and the disclosure will be described in detail.

The terms used in describing the embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the relevant description. Accordingly, the terms used herein are not to be understood simply as its designation but based on the meaning of the term and the overall context of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed description of related known technologies may unnecessarily confuse the gist of the disclosure, the detailed description will be omitted.

Terms such as "first", and "second" may be used in describing the various elements, but the elements are not to be limited by the terms. The terms may be used only to distinguish one element from another.

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

Elements described as "modules" or "part" may be physically implemented by analog and/or digital circuits including one or more of a logic gate, an integrated circuit, a microprocessor, a microcontroller, a memory circuit, a passive electronic component, an active electronic component, and the like.

Embodiments of the disclosure will be described in detail with reference to the accompanying drawings to aid in the understanding of those of ordinary skill in the art. However, the disclosure may be implemented in various different forms and it should be noted that the disclosure is not limited to the embodiments described herein. Further, in the drawings, portions not relevant to the description may be omitted, and like reference numerals may be used to indicate like elements.

FIG. 1 is a diagram illustrating a display device according to one or more embodiments of the disclosure.

Referring to FIG. 1, a display device 100 may be configured with a power supply part 110 and a plurality of display modules 120-1, . . . , **120-*n***.

The display device 100 may display video data. The display device 100 may be implemented as a TV, but is not limited thereto, and may be applicable without limitation to any device so long as the device has a display function such as, for example, and without limitation, a video wall, a large format display (LFD), a digital signage, a digital information display (DID), a projector display, and the like. In addition, the display device 100 may be implemented as display devices of various forms such as, for example, and without limitation, a liquid crystal display (LCD), an organic light-emitting diode (OLED), a Liquid Crystal on Silicon (LCoS), a Digital Light Processing (DLP), a quantum dot (QD) display panel, and quantum dot light-emitting diodes (QLED).

According to one or more embodiments, the display device 100 may be implemented in a form of a modular display which includes the plurality of display modules 120-1, . . . , **120-*n* (e.g. a first display module and a second display module). According to one or more embodiments, each of the plurality of display modules 120-1, . . . , 120-*n* may be independent elements, and form a modular display due to the plurality of display modules 120-1, . . . , 120-*n* being physically connected. Here, the each of the plurality of display modules 120-1, . . . , 120-*n* may include at least one light emitting device. The first display module may include first light emitting devices and the second display module may include second light emitting devices. The display device 100 according to one or more embodiments may consecutively operate each of the plurality of display modules 120-1, . . . , 120-*n***.

However, the embodiment is not limited thereto, and the display device 100 according to the various embodiments of the disclosure may include a plurality of scan lines, and each of the plurality of scan lines may be referred to as the display module.

For example, the display device 100 may operate in a passive matrix method. Here, the passive matrix method may include one or more driver ICs consecutively operating the plurality of scan lines. For example, the one or more driver ICs provided in the display device 100 may consecutively provide scan signals to the plurality of scan lines, and the one or more driver ICs may apply, using the plurality of data lines, data to pixels corresponding to the scan lines through which scan signals are provided from among the plurality of scan lines.

In addition, each of the plurality of display modules 120-1, . . . , **120-*n* may operate in the passive matrix method. For example, each of the plurality of display modules 120-1, . . . , 120-*n* may include the plurality of scan lines, the one or more driver ICs included in each of the plurality of display modules 120-1, . . . , 120-*n*** may consecutively provide scan signals to the plurality of scan lines, and the one or more driver ICs may apply data to pixels corresponding to the scan lines through scan signals are provided from among the plurality of scan lines using the plurality of data lines.

According to one or more embodiments, each of the plurality of display modules 120-1, . . . , **120-*n*** may include a first switch and a second switch.

The display device 100 according to one or more embodiments may consecutively operate each of the plurality of display modules 120-1, . . . , **120-*n*** by dividing a pre-set time.

For example, the display device 100 may drive (or provide a scan signal) a first display module 120-1 by selectively turning-on the first switch and the second switch included in the first display module 120-1 in a first time period corresponding to the first display module 120-1 within a pre-set time.

Then, the display device 100 may drive (or provide a scan signal) a second display module 120-2 by selectively turning-on a third switch (corresponding to the first switch) and a fourth switch (corresponding to the second switch) included in the second display module 120-2 in a second time period corresponding to the second display module 120-2 within the pre-set time. A detailed description for the above will be described below with reference to the drawings.

Figure 2:
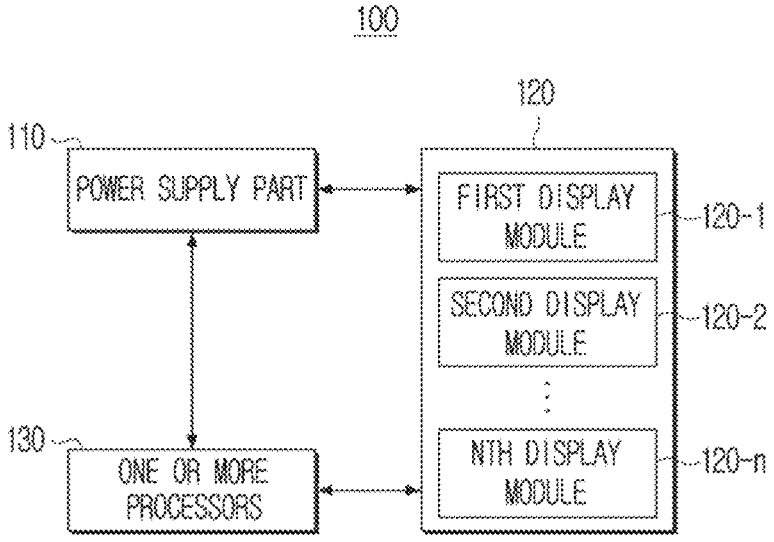
FIG. 2 is a block diagram illustrating a display device according to one or more embodiments of the disclosure.

FIG. 2 is a block diagram illustrating a display device according to one or more embodiments of the disclosure.

Referring to FIG. 2, the display device 100 may include the power supply part 110, a display panel 120, and one or more processors 130.

According to one or more embodiments, the power supply part 110 may be implemented as a switched mode power supply (SMPS)), and may include a power factor correcting circuit, that is a PFC circuit, and the like to satisfy an overall increase in power consumption and several rules according to the display device 100 being large-scaled. The power supply part 110 may include a diode bridge (or, bridge rectifier), an electromagnetic interference (EMI) filtering part, and the like. According to one or more embodiments, the diode bridge may be a bridge circuit which connects four diodes, and may be an element that rectifies alternating current inputs and changes to a direct current output. The EMI filtering part may remove electrical noise of commercial power.

According to one or more embodiments of the disclosure, the power supply part 110 may stably supply power to a load (e.g., display panel 120) of the display device 100 by converting an alternating current power source to a direct current power source. The one or more processors 130 may provide stabilized power to a load by controlling an on-off of the first switch and the second switch included in each of the plurality of display modules 120-1, . . . , **120-*n*, and consecutively operate each of the plurality of display modules 120-1, . . . , 120-*n*** which will be described below.

According to one or more embodiments, the display panel 120 may include the plurality of display modules 120-1, . . . , **120-*n*, and as described above, each of the plurality of display modules 120-1, . . . , 120-*n* may be independent elements, and the display panel 120 may be formed due to each of the plurality of display modules 120-1, . . . , 120-*n*** being coupled.

According to another example, the each of the plurality of display modules 120-1, . . . , **120-*n* may form a scan line, and the display panel 120** may include a plurality of scan lines. For example, a first scan line may correspond to the first display module and a second scan line may correspond to a second display module.

The each of the plurality of display modules 120-1, . . . , **120-*n*** according to one or more embodiments of the disclosure may include a plurality of self-emissive devices. Here, a self-emissive device may be at least one from among light emitting diodes (LEDs) or micro LEDs.

In addition, the each of the plurality of display modules 120-1, . . . , **120-*n*** may be implemented as an LED cabinet which includes a plurality of light emitting diode (LED) devices. Here, the LED devices may be implemented as RGB LEDs, and the RGB LEDs may include a red LED, a green LED, and a blue LED. In addition, the LED devices may additionally include a white LED in addition to the RGB LEDs.

According to one or more embodiments, the LED devices may be implemented with micro LEDs. Here, a micro LED may be an LED of about 5 to 100 micrometer size, and may be an ultra-small light emitting device that emits light on its own without a color filter.

However, the above is not limited thereto, and the plurality of display modules 120-1, . . . , **120-*n* may form a backlight, and irradiate light at the display panel 120 at a back surface, that is, at a surface opposite to a surface at which an image is displayed of the display panel 120**.

The one or more processors 130 according to one or more embodiments of the disclosure may control the overall operation of the display device 100.

According to one or more embodiments of the disclosure, the one or more processors may be implemented as a digital signal processor (DSP) processing digital signals, a microprocessor, or a time controller (TCON). However, the embodiment is not limited thereto, and may include one or more from among a central processing unit (CPU), a micro controller unit (MCU), a micro processing unit (MPU), a controller, an application processor (AP), a communication processor (CP), an ARM processor, or an artificial intelligence (AI) processor or may be defined by the relevant term. In addition, the one or more processors may be implemented as a System on Chip (SoC) or a large scale integration (LSI) embedded with a processing algorithm, and may be implemented in a form of a field programmable gate array (FPGA). The one or more processors may perform various functions by executing computer executable instructions stored in the memory.

The one or more processors may include one or more from among a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The one or more processors may control one or a random combination from among other elements of an electronic device, and perform an operation associated with communication or data processing. The one or more processors may execute at least one program or instruction stored in the memory. For example, the one or more processors may perform, by executing one or more instructions stored in the memory, a method according to one or more embodiments of the disclosure.

When a method according to one or more embodiments of the disclosure includes a plurality of operations, the plurality of operations may be performed by one processor, or performed by a plurality of processors. For example, when a first operation, a second operation, and a third operation are performed by a method according to one or more embodiments of the disclosure, the first operation, the second operation, and the third operation may all be performed by a first processor, or the first operation and the second operation may be performed by the first processor (e.g., a generic-purpose processor) and the third operation may be performed by a second processor (e.g., an artificial intelligence dedicated processor).

The one or more processors may be implemented with a single core processor that includes one core, or implemented with one or more multicore processors that includes a plurality of cores (e.g., a homogeneous multicore or a heterogeneous multicore). If the one or more processors are implemented with a multicore processor, each of the plurality of cores included in the multicore processor may include a memory inside the processor such as a cache memory and an on-chip memory, and a common cache shared by the plurality of cores may be included in the multicore processor. In addition, each of the plurality of cores (or a portion from among the plurality of cores) included in the multicore processor may independently read and perform a program command for implementing a method according to one or more embodiments of the disclosure, or read and perform a program command for implementing a method according to one or more embodiments of the disclosure due to a whole (or a portion) of the plurality of cores being interconnected.

When a method according to one or more embodiments of the disclosure includes a plurality of operations, the plurality of operations may be performed by one core from among the plurality of cores or performed by the plurality of cores included in the multicore processor. For example, when a first operation, a second operation, and a third operation are performed by a method according to one or more embodiments, the first operation, the second operation, and the third operation may all be performed by a first core included in the multicore processor, or the first operation and the second operation may be performed by the first core included in the multicore processor and the third operation may be performed by a second core included in the multicore processor.

In the embodiments of the disclosure, the processor may refer to a system on chip (SoC), a single core processor, or a multicore processor in which the at least one processor and other electronic components are integrated, or a core included in the single core processor or the multicore processor, and the core herein may be implemented as the CPU, the GPU, the APU, the MIC, the DSP, the NPU, the hardware accelerator, the machine learning accelerator, or the like, but the embodiments of the disclosure are not limited thereto.

According to one or more embodiments, the one or more processors 130 may be implemented with one or more driver ICs, and the one or more driver ICs may control an on and off of the first switch and the second switch included in each of the plurality of display modules 120-1, . . . , 120-*n*.

For example, the one or more processors 130 may include one or more main processors that process images and one or more driver integrated circuits (ICs) controlling the on and off of the first switch and the second switch included in each of the plurality of display modules 120-1, . . . , 120-*n*.

Figure 3:
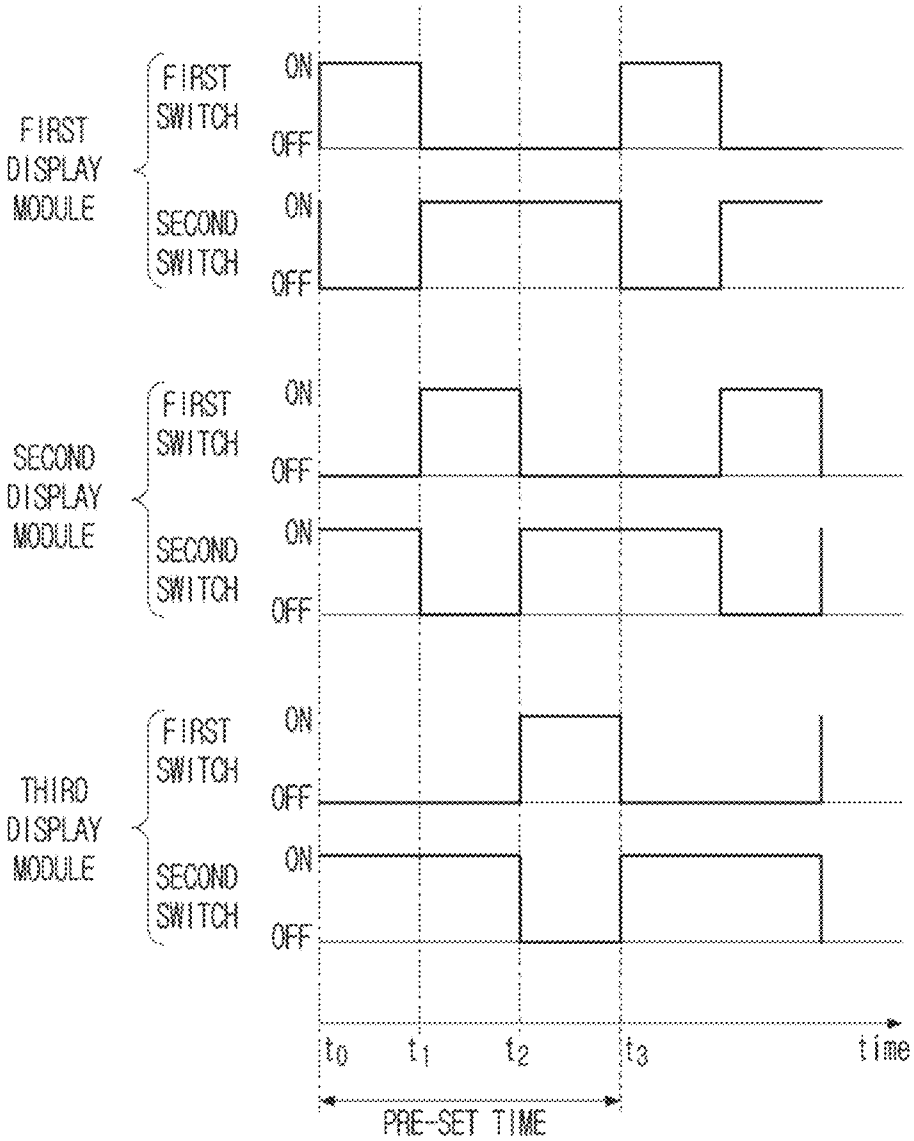
FIG. 3 is a diagram illustrating operations of a first switch and a second switch included in each of a plurality of display modules according to one or more embodiments of the disclosure.

FIG. 3 is a diagram illustrating operations of a first switch and a second switch included in each of a plurality of display modules according to one or more embodiments of the disclosure.

Referring to FIG. 3, the one or more processors 130 may consecutively supply power to the plurality of display modules 120-1, . . . , 120-*n* by selectively turning-on the first switch and the second switch included in each of the plurality of display modules 120-1, . . . , 120-*n*.

FIG. 3 shows the display panel 120 including the first display module 120-1 to a third display module 120-3 for convenience of description, but is not limited thereto.

According to one or more embodiments, a pre-set time t0 to t3 may be time corresponding to one image frame from among a plurality of image frames included in an image. For example, if a frame rate of an image is 60 frames per second (FPS), the pre-set time may be 1/60 [sec].

According to one or more embodiments, the one or more processors 130 may turn-on the first switch included in the first display module 120-1 to operate the first display module 120-1 from among the plurality of display modules 120-1, . . . , 120-*n* in a first time period t0 to t1 of the pre-set time t0 to t3.

In addition, the one or more processors 130 may turn-on the second switch included in each of the second display module 120-2 and the third display module 120-3 to operate only the first display module 120-1 in the first time period t0 to t1.

According to one or more embodiments, the first switch and the second switch included in each of the plurality of display modules 120-1, . . . , 120-*n* may be selectively turned-on. For example, when the first switch is turned-on, the second switch may be turned off, and when the first switch is turned-off, the second switch may be turned-on.

According to one or more embodiments, referring to FIG. 1, when the first switch included in each of the plurality of display modules 120-1, . . . , 120-*n* is turned-on (or, when the second switch is turned-off), a light emitting device may be turned-on because the power supply part 110 supplies power to the light emitting device, and when the second switch is turned-on (and, when the first switch is turned-off), the light emitting device may be turned-off because the power supply part 110 does not supply power to the light emitting device.

According to one or more embodiments, the one or more processors 130 may turn-on the first switch included in the second display module 120-2 in a second time period t1 to t2 after the first time period t0 to t1 of the pre-set time t0 to t3 has passed to consecutively operate each of the plurality of display modules 120-1, . . . , 120-*n*.

In addition, the plurality of display modules 120-1, . . . , 120-*n* may turn-on the second switch included in each of the first display module 120-1 and the third display module 120-3 to operate only the second display module 120-2 in the second time period t1 to t2.

According to one or more embodiments, the one or more processors 130 may turn-on the first switch included in the third display module 120-3 in a third time period t2 to t3 after the second time period t1 to t2 of the pre-set time t0 to t3 has passed.

In FIG. 3, for convenience of description, the pre-set time period t0 to t3 has been divided into three periods to show the on and off operation of the first switch and the second switch included in each of the first to third display modules 120-1, 120-2, and 120-3, but the embodiment is not limited thereto, and the display panel 120 according to one or more embodiments may include first to nth display modules 120-1, . . . , 120-*n*, and the preset time period (e.g., time corresponding to one image frame) may be divided into n-number of periods.

According to one or more embodiments, an operation of driving each of the plurality of display modules 120-1, . . . , 120-*n* by dividing the pre-set time period may be represented as a time-division driving.

Arrangements of the first switch and the second switch included in each of the plurality of display modules 120-1, . . . , 120-*n* will be described in detail below.

Figure 4:
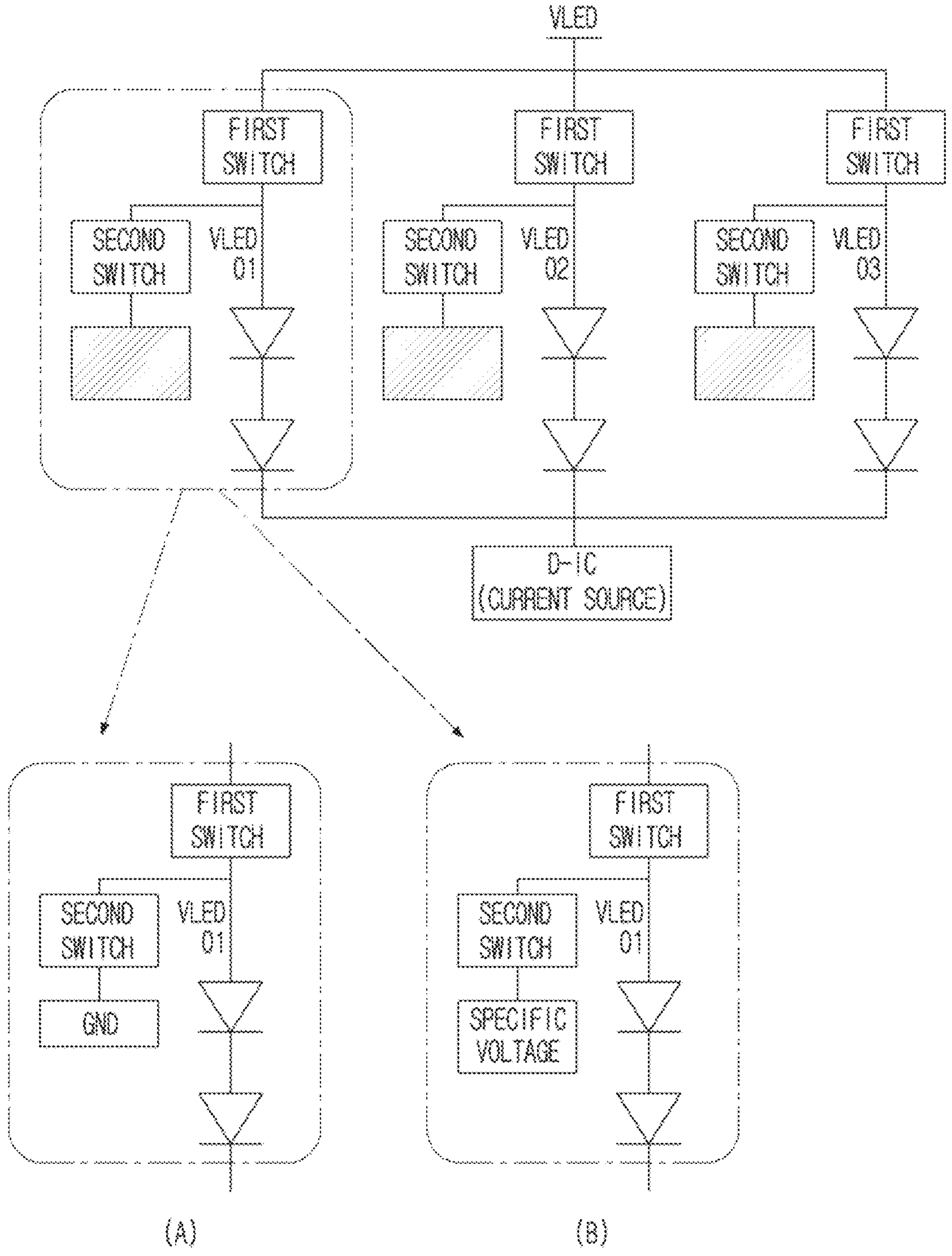
FIG. 4 is a diagram illustrating a first switch and a second switch included in a display module according to one or more embodiments of the disclosure.

FIG. 4 is a diagram illustrating a first switch and a second switch included in a display module according to one or more embodiments of the disclosure.

Referring to FIG. 4, the display device 100 may include the plurality of display modules 120-1, . . . , 120-*n*, and each of the plurality of display modules 120-1, . . . , 120-*n* may include the first switch and the second switch.

Referring to the first display module 120-1, if the first switch included in the first display module 120-1 is turned-on, because the power supply part 110 provides power to a plurality of light emitting devices included in the first display module 120-1, the plurality of light emitting devices may emit light.

In the related art, if the first display module 120-1 is turned-off, there has been a problem of the plurality of light emitting devices weakly emitting light due to the potential (or, energy) remaining in the plurality of light emitting devices included in the first display module 120-1.

For example, in the related art, the one or more processors 130 may turn-off the first display module 120-1 in the second time period t1 to t2 and the third time period t2 to t3 of the pre-set time period t0 to t3, and turn-on the second switch as shown in (A) of FIG. 4 to control the first display module 120-1 for the plurality of light emitting devices included in the first display module 120-1 to not weakly emit light.

Referring to (A) of FIG. 4, because the first switch is turned-off and the second switch is turned-on in the first display module 120-1 while the first display module 120-1 is being turned-off, the potential remaining in the first display module 120-1 may go to earth ground (Ground, GND). For example, discharge circuits may be provided in each of the plurality of display modules 120-1, . . . , 120-*n*, and the potential remaining in the remaining display modules excluding the operating display modules may be removed through the earth ground However, in the related art, because the potential remaining in the first display module 120-1 instantaneously goes to earth ground, there has been a problem of noise and the like occurring due to shaking of the printed circuit board (PCB)

circuit that form the first display module 120-1, or affecting a lifespan of the plurality of light emitting devices.

Referring to (B) of FIG. 4, because the first switch is turned-off and the second switch is turned-on in the first display module 120-1 while the first display module 120-1 is being turned-off, a voltage change magnitude of the plurality of light emitting devices may reduce compared to when the potential remaining in the first display module 120-1 goes to earth ground due to a specific voltage being applied to the plurality of light emitting devices of the first display module 120-1.

Figure 5A:
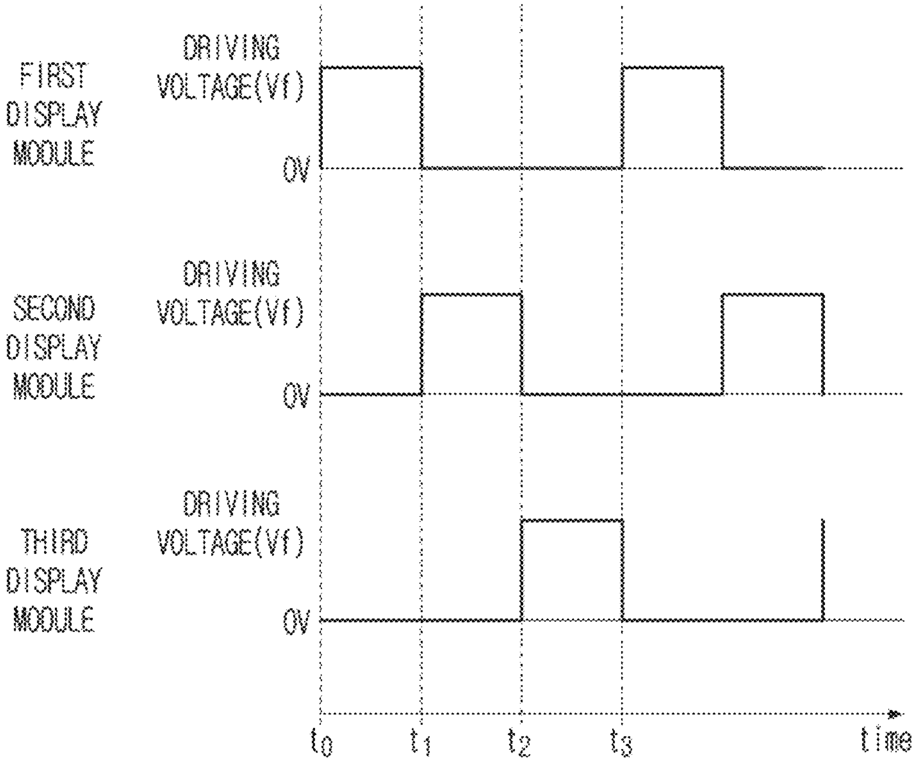
FIG. 5A is a diagram illustrating a change in voltage of each of a plurality of display modules according to the related art.

FIG. 5A is a diagram illustrating a change in voltage of each of a plurality of display modules according to the related art.

FIG. 5A is a graph illustrating a change in voltage of each of the plurality of display modules 120-1, . . . , **120-*n* when the second switch included in each of the plurality of display modules 120-1, . . . , 120-*n* is connected with the ground voltage (GND) as shown in (A) of FIG. 4**.

Referring to the graph shown at an upper side of FIG. 5A, a forward voltage Vf for emitting a plurality of light emitting devices in the plurality of light emitting devices included in the first display module 120-1 may be applied at the first time period t0 to t1 of the pre-set time t0 to t3. For example, the one or more processors 130 may turn-on the first switch and turn-off the second switch for the power supply part 110 to apply the forward voltage Vf to the plurality of light emitting devices at the first time period t0 to t1 of the pre-set time t0 to t3.

Then, the one or more processors 130 may turn-off the first switch and turn-on the second switch to turn-off the plurality of light emitting devices included in the first display module 120-1 at the second time period t1 to t2 and the third time period t2 to t3 of the pre-set time t0 to t3.

According to one or more embodiments, if the one or more processors 130 turn-off the first switch and turn-on the second switch, voltage of the first display module 120-1 may change to voltage from a driving voltage or a forward voltage Vf to earth ground, that is, 0 [v].

According to one or more embodiments, because the voltage of the first display module 120-1 suddenly changes from the forward voltage Vf (e.g., 52[V] to 64[V]) to 0[V], energy efficiency may decrease (e.g., increase in energy loss rate), and noise may be generated due to shaking of the PCB circuit.

Referring to the graph shown in FIG. 5A, noise may be generated due to a sudden change in voltage of the first display module 120-1 when the second time period t1 to t2 starts after the first time period t0 to t1 has passed, noise may be generated due to a sudden change in voltage of the second display module 120-2 when the third time period t2 to t3 starts after the second time period t1 to t2 has passed, and noise may be generated due to a sudden change in voltage in the third display module 120-3 when a pre-set time period (after t3) starts after the third time period t2 to t3 has passed.

Figure 5B:
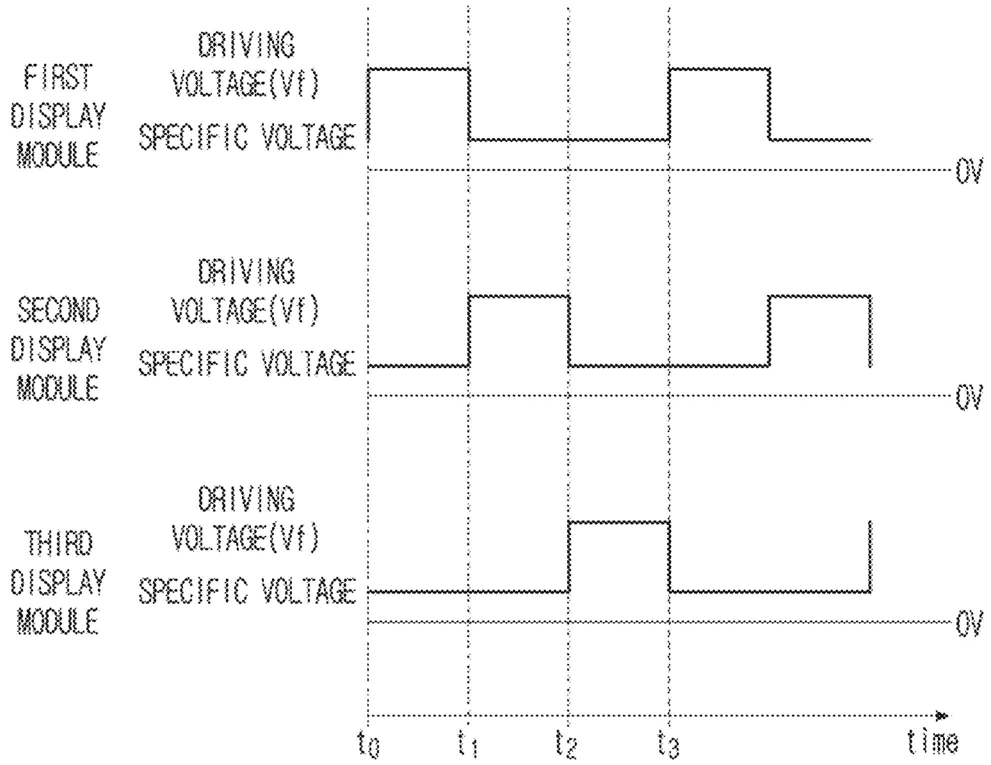
FIG. 5B is a diagram illustrating a change in voltage of each of a plurality of display modules according to one or more embodiments of the disclosure.

FIG. 5B is a diagram illustrating a change in voltage of each of a plurality of display modules according to one or more embodiments of the disclosure.

FIG. 5B is a graph illustrating a change in voltage of each of the plurality of display modules 120-1, . . . , **120-*n* when the second switch included in each of the plurality of display modules 120-1, . . . , 120-*n* are connected at a pre-set voltage as shown in (B) of FIG. 4**.

Referring to the graph shown at the upper side of FIG. 5B, the one or more processors 130 may turn-off the first switch and turn-on the second switch to turn-off the plurality of light emitting devices included in the first display module 120-1 at the second time period t1 to t2 and the third time period t2 to t3 after the first time period t0 to t1 has passed of the pre-set time t0 to t3.

Because the first switch is turned-off and the second switch is turned-on in the first display module 120-1 when the second time period t1 to t2 starts after the first time period t0 to t1 has passed, the voltage of the first display module 120-1 may change from the driving voltage or the forward voltage Vf to the pre-set voltage.

According to one or more embodiments, the pre-set voltage may be greater than or equal to a voltage according to earth voltage (e.g., 0[V]), and less than the forward voltage Vf for emitting the plurality of light emitting devices.

For example, if the forward voltage Vf for emitting the plurality of light emitting devices included in the first display module 120-1 is 52[V], the pre-set voltage may be greater than or equal to 0[V] and less than 52[V].

Referring to the graph shown in FIG. 5B, the generating of noise may be minimized because the voltage of the first display module 120-1 is reduced by only the pre-set voltage (e.g., forward voltage Vf-pre-set voltage) from the forward voltage Vf when the second time period t1 to t2 starts after the first time period t0 to t1 has passed, the generating of noise may be minimized because the voltage of the second display module 120-2 has not suddenly changed when the third time period t2 to t3 starts after the second time period t1 to t2 has passed, and the generating of noise may be minimized because the voltage of the third display module 120-3 has not suddenly changed when the pre-set time period (after t3) starts (e.g., next image frame) after the third time period t2 to t3 has passed.

The relationship between the forward voltage Vf and the pre-set voltage will be described in detail with reference to the drawings below.

Figure 6:
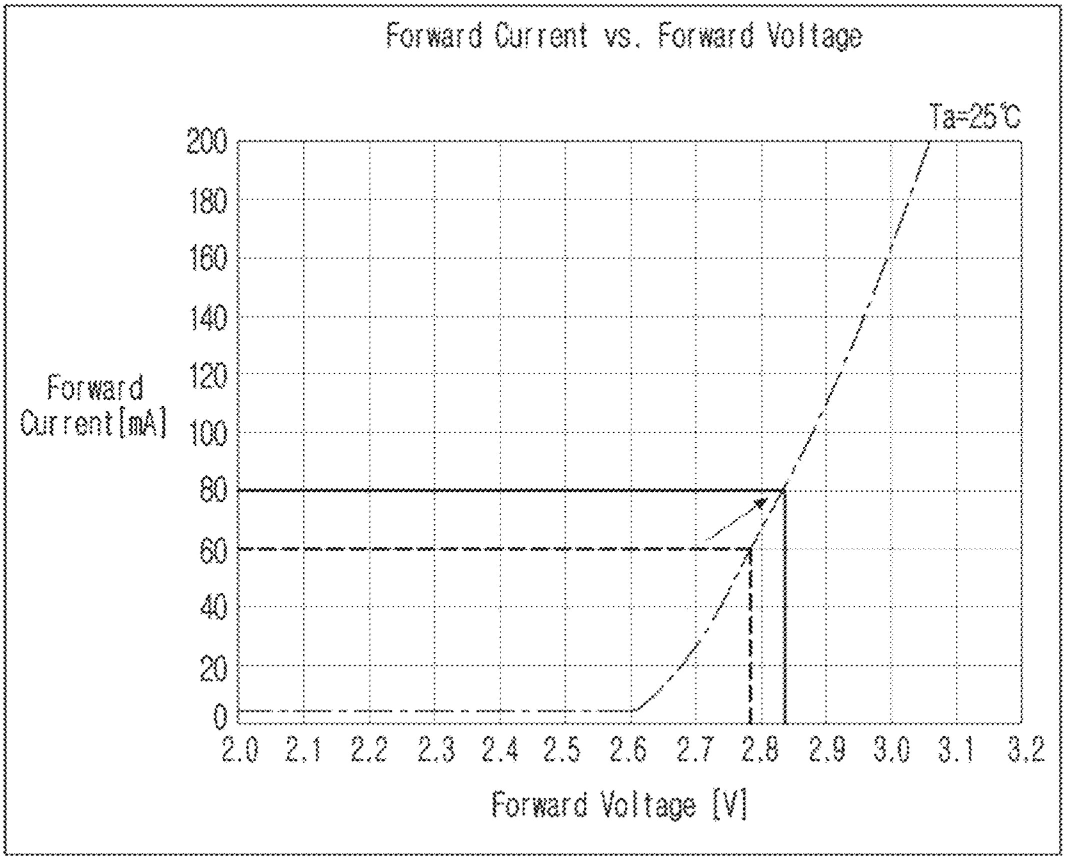
FIG. 6 is a diagram illustrating a relationship between an output current and a forward voltage according to one or more embodiments of the disclosure.

FIG. 6 is a diagram illustrating a relationship between an output current and a forward voltage according to one or more embodiments of the disclosure.

Referring to FIG. 6, the forward voltage Vf of each of the plurality of light emitting devices included in each of the plurality of display modules 120-1, . . . , **120-*n*** may not be a fixed voltage, and may change according to a magnitude of forward current If.

For example, as the forward current If is increased, the forward voltage Vf may also be increased.

According to one or more embodiments, the one or more processors 130 may adjust the driving voltage (i.e., forward voltage Vf) based on an output current (i.e., forward current If) of the power supply part 110.

For example, the one or more processors 130 may increase the forward voltage Vf according to the output current of the power supply part 110 increasing.

According to one or more embodiments, the one or more processors 130 may adjust the pre-set voltage to be less than the adjusted forward voltage Vf, and for example, increase the pre-set voltage as the forward voltage increases.

For example, when the output current of the power supply part 110 increases, the forward voltage Vf which emits each of the plurality of light emitting devices included in each of the plurality of display modules 120-1, . . . , **120-*n*** may also increase.

According to one or more embodiments, the one or more processors 130 may increase, when the forward voltage Vf is increased, the pre-set voltage for the voltage of each of the plurality of display modules 120-1, . . . , **120-*n*** to not suddenly change.

Referring to the graph shown in FIG. 5B, because the voltage of the first display module 120-1 is reduced by the pre-set voltage (e.g., forward voltage Vf-pre-set voltage) from the forward voltage Vf when the second time period t1 to t2 starts after the first time period to to t1 has passed, the one or more processors 130 may increase the pre-set voltage if the forward voltage Vf is increased to reduce an amount of change in voltage.

In another example, the one or more processors 130 may reduce, based on the forward voltage Vf decreasing, the pre-set voltage to be less than the forward voltage Vf.

Referring to the graph shown in FIG. 5B, because the plurality of light emitting devices included in the first display module 120-1 do not emit light when the voltage of the first display module 120-1 is reduced to the pre-set voltage from the forward voltage Vf when the second time period t1 to t2 starts after the first time period t0 to t1 has passed, the one or more processors 130 may reduce the pre-set voltage when the forward voltage Vf is reduced.

Figure 7:
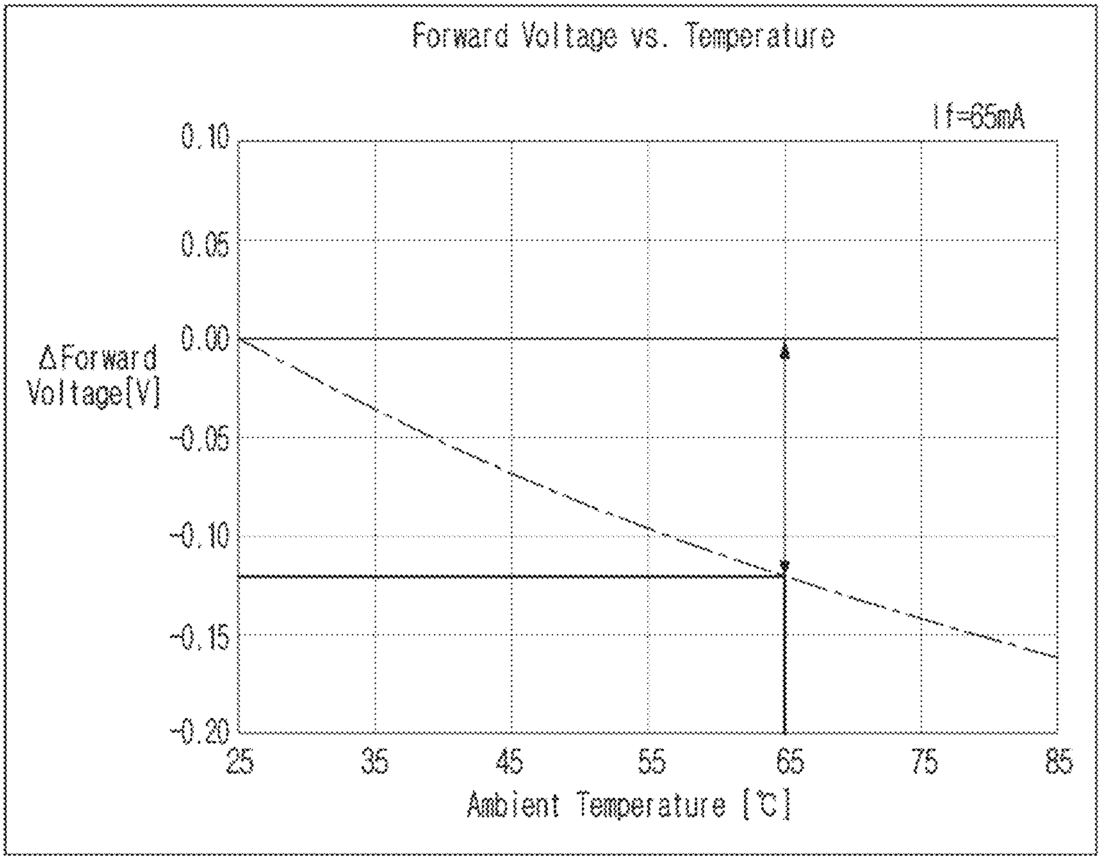
FIG. 7 is a diagram illustrating a relationship between a temperature and a forward voltage according to one or more embodiments of the disclosure.

FIG. 7 is a diagram illustrating a relationship between a temperature and a forward voltage according to one or more embodiments of the disclosure.

Referring to FIG. 7, the forward voltage Vf of each of the plurality of light emitting devices included in each of the plurality of display modules 120-1, . . . , **120-*n*** may not be a fixed voltage, and may change according to ambient temperature.

For example, as ambient temperature increases, the forward voltage Vf may decrease.

According to one or more embodiments, the one or more processors 130 may reduce, based on the forward voltage Vf decreasing according the ambient temperature, the pre-set voltage to be less than the decreased forward voltage Vf. For example, the one or more processors 130 may decrease, based on the forward voltage Vf decreasing due to the ambient temperature increasing, the pre-set voltage to be greater than or equal to 0[V] and less than the reduced forward voltage Vf.

In another example, the one or more processors 130 may increase, based on the forward voltage Vf increasing according to the ambient temperature, the pre-set voltage to reduce the amount of change in voltage. For example, the one or more processors 130 may increase, based on the forward voltage Vf increasing due to the ambient temperature decreasing, the pre-set voltage to prevent the problem of noise being generated due to a difference between the increased forward voltage Vf and the pre-set voltage increasing, or affecting the lifespan of the light emitting device.

Figure 8:
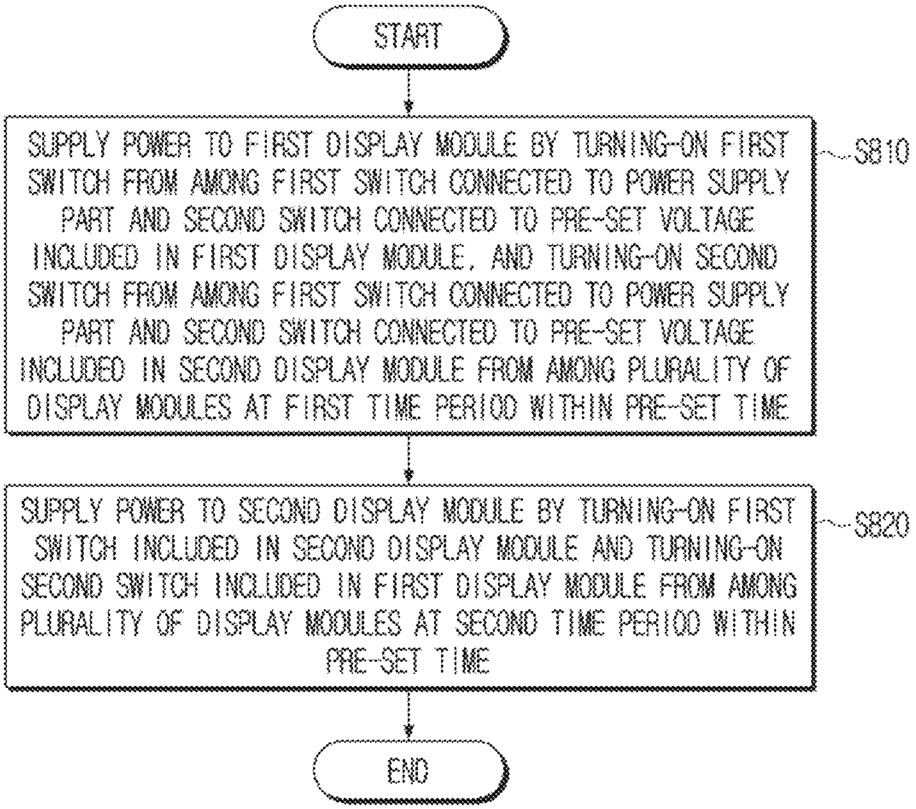
FIG. 8 is a flowchart illustrating a control method of a display device according to one or more embodiments of the disclosure.

FIG. 8 is a flowchart illustrating a control method of a display device according to one or more embodiments of the disclosure.

According to one or more embodiments of the disclosure, a control method of the display device that consecutively provides power to the plurality of display modules through the power supply part includes supplying power to the first display module by turning-on the first switch from among the first switch and the second switch included in the first display module and turning-on the second switch from among the first switch and the second switch included in the second display module from among the plurality of display modules at the first time period within the pre-set time (S810).

Then, power may be provided to the second display module by turning-on the first switch included in the second display module and turning-on the second switch included in the first display module from among the plurality of display modules at the second time period within the pre-set time (S820).

Step S810 which includes supplying power to the first display module may include emitting the plurality of light emitting devices included in the first display module by turning-on the first switch and turning-off the second switch included in the first display module at the first time period and turning-off the plurality of light emitting devices included in the second display module by turning-off the first switch and turning-on the second switch included in the second display module at the first time period.

Step S820 which includes supplying power to the second display module may include turning-off the plurality of light emitting devices included in the first display module by turning-off the first switch and turning-on the second switch included in the first display module at the second time period following the first time period and emitting the plurality of light emitting devices included in the second display module by turning-on the first switch and turning-off the second switch included in the second display module at the second time period.

According to one or more embodiments of the disclosure, step S810 which includes supplying power to the first display module may include providing the pre-set voltage to the plurality of light emitting devices included in the second display module at the first time period, and step S820 which includes supplying power to the second display module may include providing the pre-set voltage to the plurality of light emitting devices included in the first display module at the second time period.

The control method according to one or more embodiments of the disclosure may further include supplying the driving voltage to any one display module in which the first switch is turned-on from among the plurality of display modules, and the pre-set voltage may be less than the driving voltage.

The pre-set voltage according to one or more embodiments of the disclosure may be greater than or equal to the voltage according to earth ground and less than the forward voltage Vf of the plurality of light emitting devices included in each of the plurality of display modules.

The control method according to one or more embodiments of the disclosure may further include adjusting the driving voltage based on the output current of the power supply part, and adjusting the pre-set voltage to be less than the adjusted driving voltage.

The display device according to one or more embodiments of the disclosure may operate in the passive matrix method, and each of the plurality of display modules may correspond to each of the plurality of scan lines.

The pre-set time according to one or more embodiments of the disclosure may correspond to one image frame, and the control method may further include consecutively supplying power to the plurality of display modules during the one image frame.

The each of the plurality of display modules according to one or more embodiments of the disclosure may include a backlight or a plurality of self-emissive devices.

However the various embodiments of the disclosure may be applied to not only the display device, but also to electronic devices of all types that include a display.

Meanwhile, the various embodiments described above may be implemented in a computer or in a recording medium readable by a similar device using a software, a hardware, or a combination thereof. In some cases, embodiments described herein may be implemented by the processor itself. According to a software implementation, embodiments such as the procedures and functions described herein may be implemented with separate software modules. Each of the software modules may perform one or more functions and operations described herein.

Meanwhile, the computer instructions for performing processing operations in the electronic device according to the various embodiments of the disclosure described above may be stored in a non-transitory computer-readable medium. The computer instructions stored in this non-transitory computer-readable medium may cause a specific device to perform a processing operation of the electronic device according to the above-described various embodiments when executed by a processor of the specific device.

The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

While the disclosure has been illustrated and described with reference to various embodiments thereof, it will be understood that the various embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display device, comprising:

a power supply;

a first display module comprising a first switch and a second switch, the first switch being connected to the power supply and the second switch being connected to a preset voltage;

a second display module comprising a third switch and a fourth switch, the third switch being connected to the power supply and the fourth switch being connected to the preset voltage;

one or more processors configured to consecutively supply power to the first display module and the second display module by selectively turning on the first switch, the second switch, the third switch, and the fourth switch; and memory storing instructions that when executed by the one or more processors, cause the one or more processors to:

turn on the first switch and the fourth switch during a first time period within a preset time; and turn on the third switch and the second switch during a second time period within the preset time.

2. The display device of claim 1, wherein the instructions further cause the one or more processors to:

emit using first light emitting devices in the first display module by turning on the first switch and turning off the second switch during the first time period; and turn off second light emitting devices in the second display module by turning off the third switch and turning on the fourth switch during the first time period.

3. The display device of claim 2, wherein the instructions further cause the one or more processors to:

turn off the first light emitting devices by turning off the first switch and turning on the second switch during the second time period following the first time period; and emit using the second light emitting devices by turning on the third switch and turning off the fourth switch during the second time period.

4. The display device of claim 3, wherein the instructions further cause the one or more processors to:

provide the preset voltage to the second light emitting devices during the first time period; and provide the preset voltage to the first light emitting devices during the second time period.

5. The display device of claim 2, wherein the power supply is configured to supply driving voltage to the first display module when the first switch is turned on or the second display module when the third switch is turned on according to control by the one or more processors, and wherein the preset voltage is less than the driving voltage.

6. The display device of claim 5, wherein the preset voltage is greater than or equal to earth ground and less than a forward voltage Vf of the first light emitting devices and the second light emitting devices.

7. The display device of claim 5, wherein the instructions further cause the one or more processors to:

adjust the driving voltage based on an output current of the power supply; and adjust the preset voltage to be less than the adjusted driving voltage.

8. The display device of claim 1, wherein the display device is configured to operate in a passive matrix method, and wherein the first display module corresponds to a first scan line and the second display module corresponds to a second scan line.

9. The display device of claim 1, wherein the preset time corresponds to one image frame, and wherein the instructions further cause the one or more processors to consecutively supply power to the first display module and the second display module during the one image frame.

10. The display device of claim 1, wherein the first display module and the second display module comprise a backlight or a plurality of self-emissive devices.

11. A method of controlling a display device which consecutively supplies power to a first display module and a second display module through a power supply, the method comprising:

powering the first display module by turning on a first switch in the first display module and connected to the power supply, and turning on a fourth switch in the second display module and connected to a preset voltage, during a first time period within a preset time; and powering the second display module by turning on a third switch in the second display module and connected to the power supply and turning on a second switch in the first display module and connected to the preset voltage, during a second time period within the preset time.

12. The method of claim 11, wherein the powering the first display module comprises:

emitting using first light emitting devices in the first display module by turning on the first switch and turning off the second switch during the first time period; and turning off second light emitting devices in the second display module by turning off the third switch and turning on the fourth switch during the first time period.

13. The method of claim 12, wherein the powering the second display module comprises:

turning off the first light emitting devices by turning off the first switch and turning on the second switch during the second time period following the first time period; and emitting using the second light emitting devices by turning on the third switch and turning off the fourth switch during the second time period.

14. The method of claim 13, wherein the powering the first display module comprises providing the preset voltage to the second light emitting devices during the first time period, and wherein the powering the second display module comprises providing the preset voltage to the first light emitting devices during the second time period.

15. The method of claim 11, wherein the method further comprises supplying driving voltage to the first display module when the first switch is turned on or the second display module when the third switch is turned on, and wherein the preset voltage is less than the driving voltage.

16. The method of claim 15, wherein the preset voltage is greater than or equal to earth ground and less than a forward voltage Vf of the first light emitting devices and the second light emitting devices.

17. The method of claim 15, further comprising:

adjusting the driving voltage based on an output current of the power supply; and adjusting the preset voltage to be less than the adjusted driving voltage.

18. The method of claim 11, wherein the display device is configured to operate in a passive matrix method, and wherein the first display module corresponds to a first scan line and the second display module corresponds to a second scan line.

19. The method of claim 11, wherein the preset time corresponds to one image frame, further comprising:

consecutively supplying power to the first display module and the second display module during the one image frame.

20. A computer readable recording medium, which includes computer-readable code that when executed by a display device which consecutively supplies power to a first display module and a second display module through a power supply, the method comprising:

powering the first display module by turning on a first switch in the first display module and connected to the power supply, and turning on a fourth switch in the second display module and connected to a preset voltage, during a first time period within a preset time; and powering the second display module by turning on a third switch in the second display module and connected to the power supply and turning on a second switch in the first display module and connected to the preset voltage, during a second time period within the preset time.

* * * * *